US012620134B2

(12) United States Patent
Wu et al.

(10) Patent No.: US 12,620,134 B2
(45) Date of Patent: May 5, 2026

(54) GENERATING COLOR CORRECTION MODEL INCLUDING COLOR SPACE CONVERSION, THROUGH AN INTERPOLATION ALGORITHM ACCORDING TO COLOR DATA OF REFERENCE SAMPLING POINTS

(71) Applicant: BOE TECHNOLOGY GROUP CO., LTD., Beijing (CN)

(72) Inventors: Yanhong Wu, Beijing (CN); Xian Wang, Beijing (CN); Dan Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 531 days.

(21) Appl. No.: 18/024,994

(22) PCT Filed: Jun. 30, 2022

(86) PCT No.: PCT/CN2022/102989
§ 371 (c)(1),
(2) Date: Mar. 7, 2023

(87) PCT Pub. No.: WO2024/000473
PCT Pub. Date: Jan. 4, 2024

(65) Prior Publication Data
US 2024/0282007 A1 Aug. 22, 2024

(51) Int. Cl.
*G06T 7/90* (2017.01)
*G06T 11/10* (2026.01)

(52) U.S. Cl.
CPC ............... *G06T 7/90* (2017.01); *G06T 11/10* (2026.01); *G06T 2207/10024* (2013.01); *G06T 2207/20081* (2013.01)

(58) Field of Classification Search
CPC ..................... G06T 7/90; G06T 11/001; G06T 2207/10024; G06T 2207/20081; G06N 3/08
See application file for complete search history.

(56) References Cited

U.S. PATENT DOCUMENTS 5,774,230 A * 6/1998 Goto ...................... H04N 1/603
382/167
2022/0138986 A1* 5/2022 Wei ........................... G01J 3/50
382/157

FOREIGN PATENT DOCUMENTS

CN 102769759 A 11/2012
CN 103354073 A 10/2013
CN 104217409 A 12/2014
(Continued)

*Primary Examiner* — Christopher Wait
(74) *Attorney, Agent, or Firm* — HOUTTEMAN LAW LLC

(57) ABSTRACT

A method of generating a color correction model, including: acquiring first color coordinates of a sample pixel in a first color space; converting the first color coordinates of the sample pixel to second color coordinates of the sample pixel in a second color space; inputting the second color coordinates of the sample pixel into an initial color correction model to generate sample output data; and training the initial color correction model according to the sample output data and theoretical output data corresponding to the first color coordinates, to obtain a trained color correction model, where the trained color correction model is configured to perform color correction on a target pixel in each of a plurality of video standards.

17 Claims, 6 Drawing Sheets

CIE 1931

CIELAB (CIE 1976 L*,a*,b*)

(56)        References Cited

FOREIGN PATENT DOCUMENTS

| CN | 109523485 | A | 3/2019 |
| CN | 109741279 | A | 5/2019 |
| CN | 109903256 | A | 6/2019 |
| CN | 110149507 | A | 8/2019 |
| CN | 110992289 | A | 4/2020 |
| CN | 112529775 | A | 3/2021 |
| CN | 112770096 | A | 5/2021 |
| CN | 114512085 | A | 5/2022 |

* cited by examiner

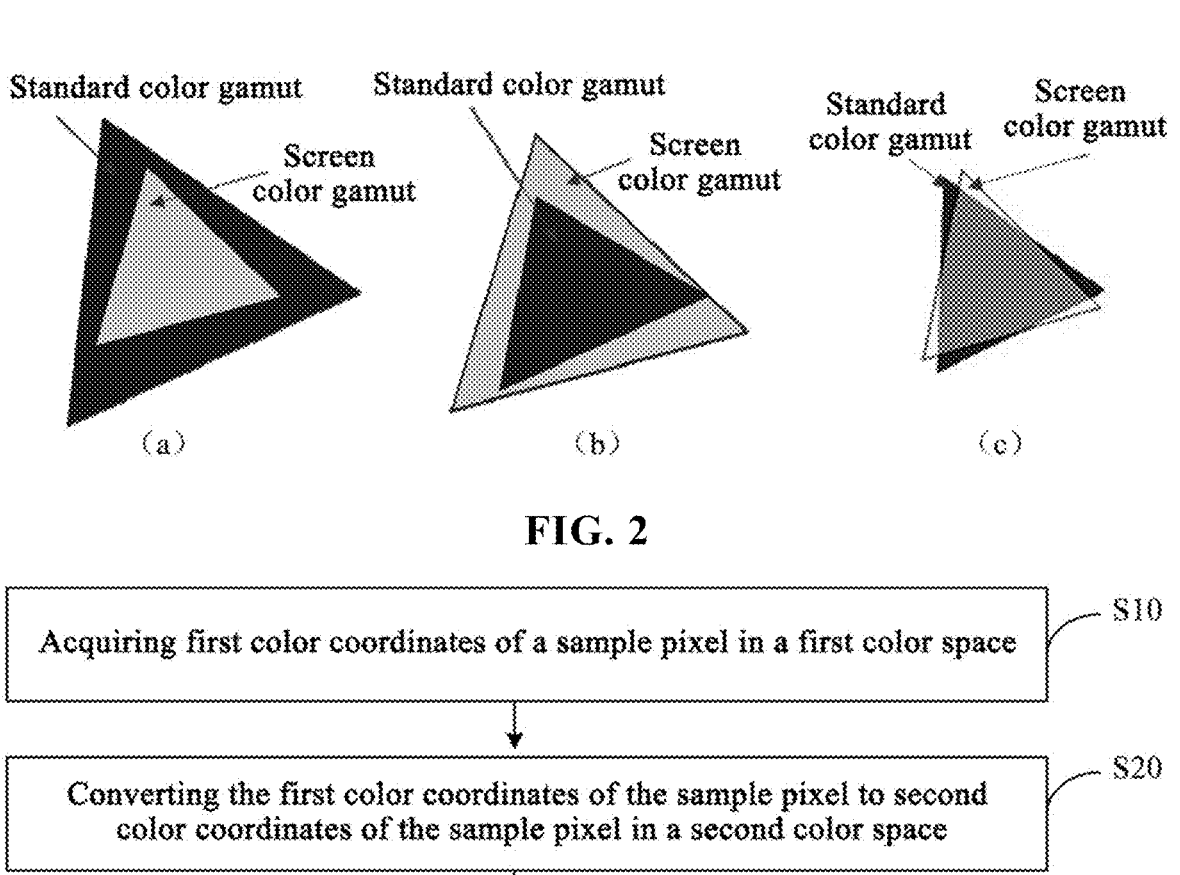

FIG. 2

| Acquiring first color coordinates of a sample pixel in a first color space | S10 |

↓

| Converting the first color coordinates of the sample pixel to second color coordinates of the sample pixel in a second color space | S20 |

↓

| Inputting the second color coordinates of the sample pixel to an initial color correction model, to generate sample output data | S30 |

↓

| Training the initial color correction model according to the sample output data and theoretical output data corresponding to the first color coordinates, to obtain a trained color correction model | S40 |

FIG. 3

| Converting the first color coordinates of the sample pixel to linear coordinates, according to a rule of non-linear conversion corresponding to the preset video standard | S21 |

↓

| Converting the linear coordinates of the sample pixel to corresponding second color coordinates, according to a rule of conversion between the linear coordinates and the second color coordinates | S22 |

FIG. 4

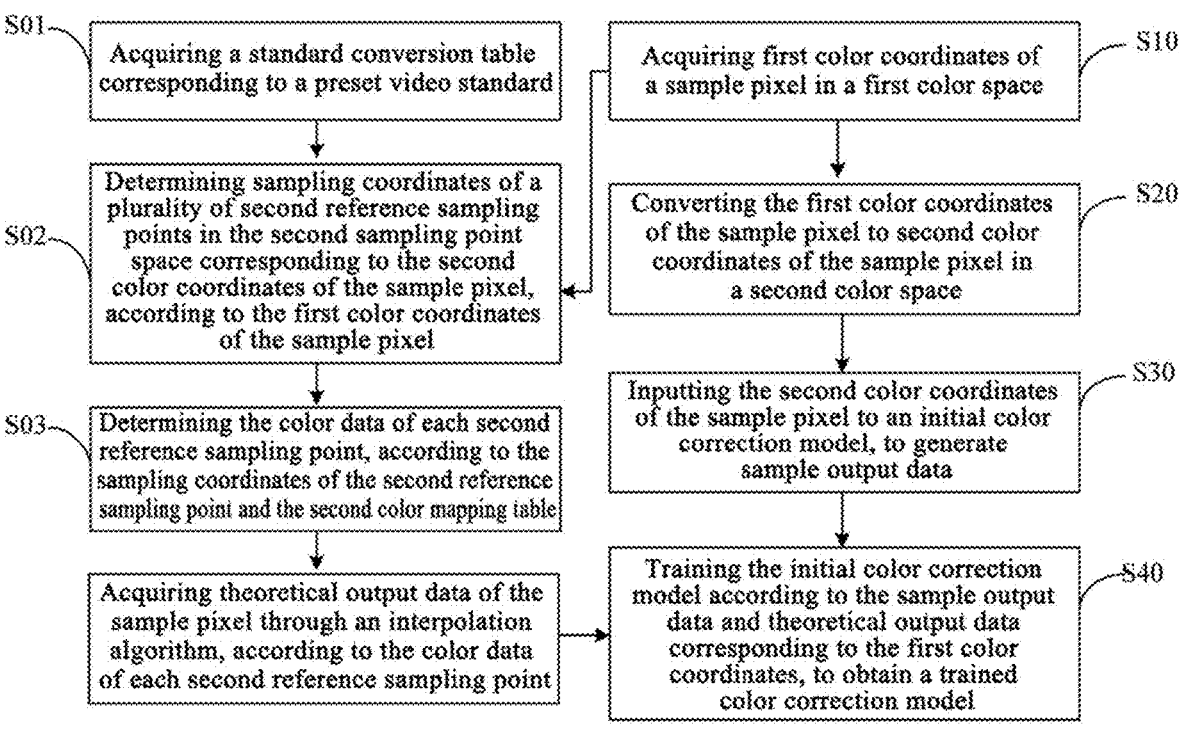

S01 — Acquiring a standard conversion table corresponding to a preset video standard S02 — Determining sampling coordinates of a plurality of second reference sampling points in the second sampling point space corresponding to the second color coordinates of the sample pixel, according to the first color coordinates of the sample pixel S03 — Determining the color data of each second reference sampling point, according to the sampling coordinates of the second reference sampling point and the second color mapping table Acquiring theoretical output data of the sample pixel through an interpolation algorithm, according to the color data of each second reference sampling point S10 — Acquiring first color coordinates of a sample pixel in a first color space S20 — Converting the first color coordinates of the sample pixel to second color coordinates of the sample pixel in a second color space S30 — Inputting the second color coordinates of the sample pixel to an initial color correction model, to generate sample output data S40 — Training the initial color correction model according to the sample output data and theoretical output data corresponding to the first color coordinates, to obtain a trained color correction model

FIG. 8

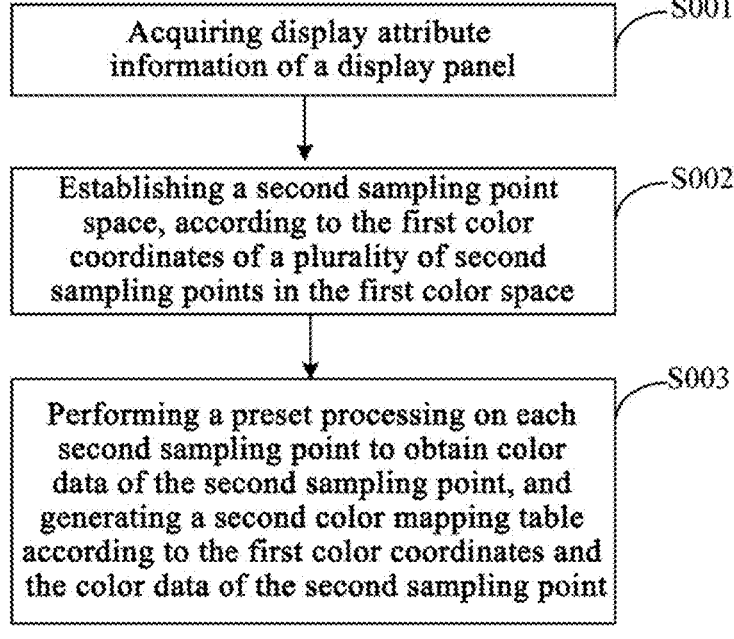

S001 — Acquiring display attribute information of a display panel

S002 — Establishing a second sampling point space, according to the first color coordinates of a plurality of second sampling points in the first color space S003 — Performing a preset processing on each second sampling point to obtain color data of the second sampling point, and generating a second color mapping table according to the first color coordinates and the color data of the second sampling point

FIG. 9

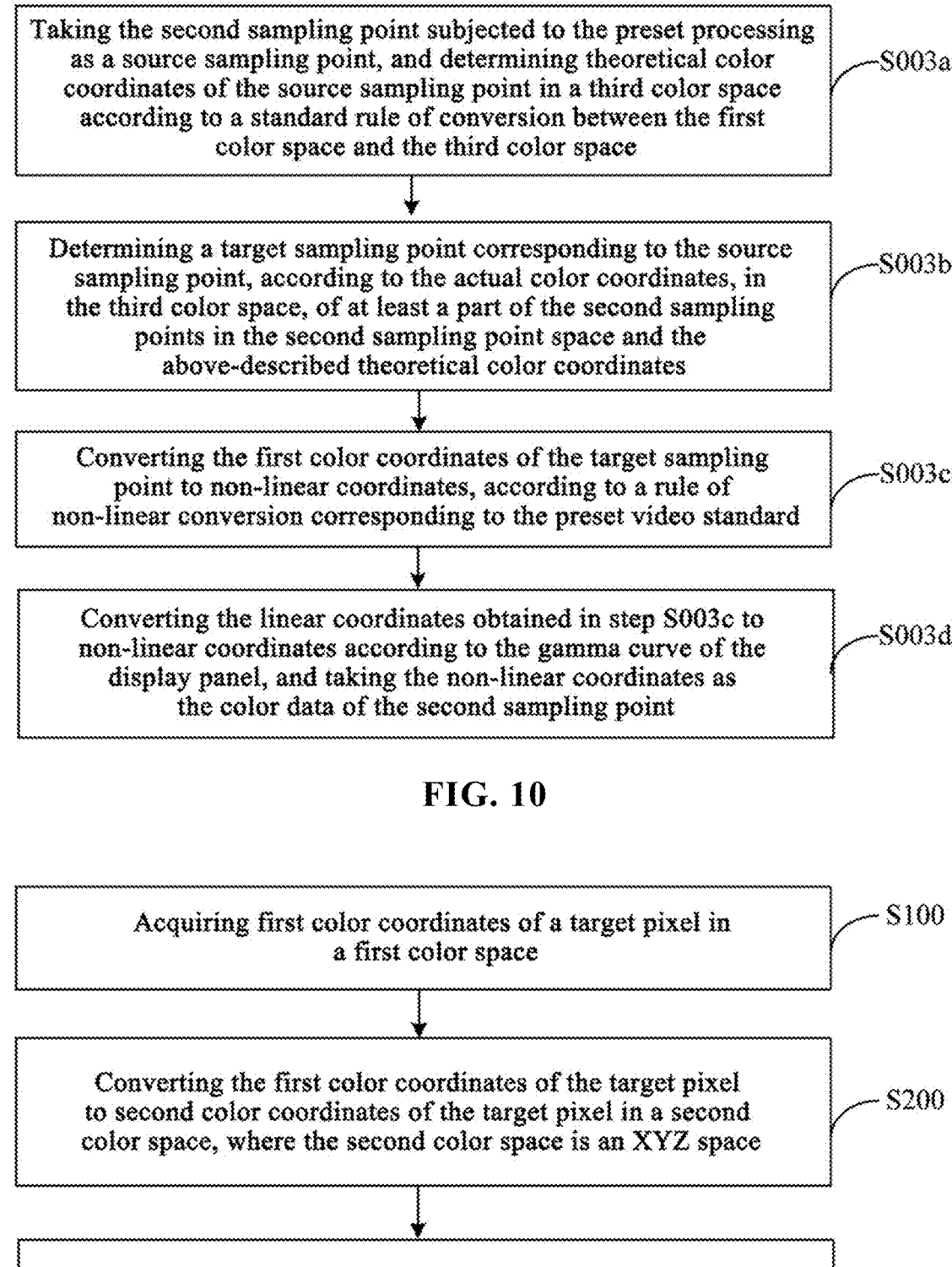

Taking the second sampling point subjected to the preset processing as a source sampling point, and determining theoretical color coordinates of the source sampling point in a third color space according to a standard rule of conversion between the first color space and the third color space ⟋—S003a Determining a target sampling point corresponding to the source sampling point, according to the actual color coordinates, in the third color space, of at least a part of the second sampling points in the second sampling point space and the above-described theoretical color coordinates ⟋—S003b Converting the first color coordinates of the target sampling point to non-linear coordinates, according to a rule of non-linear conversion corresponding to the preset video standard ⟋—S003c Converting the linear coordinates obtained in step S003c to non-linear coordinates according to the gamma curve of the display panel, and taking the non-linear coordinates as the color data of the second sampling point ⟋—S003d

FIG. 10

Acquiring first color coordinates of a target pixel in a first color space ⟋— S100

Converting the first color coordinates of the target pixel to second color coordinates of the target pixel in a second color space, where the second color space is an XYZ space ⟋— S200

Inputting the second color coordinates of the target pixel into a trained color correction model to obtain target output data ⟋— S300

FIG. 11

GENERATING COLOR CORRECTION MODEL INCLUDING COLOR SPACE CONVERSION, THROUGH AN INTERPOLATION ALGORITHM ACCORDING TO COLOR DATA OF REFERENCE SAMPLING POINTS

TECHNICAL FIELD

The present disclosure relates to the field of display technology, and in particular to a method of generating a color correction model, a method of correcting color, an apparatus for generating a color correction model, an apparatus for correcting color, a computer readable medium, and a display device.

BACKGROUND

With the development of image and video technologies, people are increasingly pursuing more perfect display effect of video images. Among many image characteristics, color is one of the most direct perceptual attributes of the human visual system, and has been deeply and widely studied. Color management is a necessary function of a high-end display. Screens with differences in display characteristics can achieve the same color expression as a standard image, after colors of the screens are corrected.

SUMMARY

The present disclosure provides a method of generating a color correction model, a method of correcting color, an apparatus for generating a color correction model, an apparatus for correcting color, a computer readable medium, and a display device.

In a first aspect, an embodiment of the present disclosure provides a method of generating a color correction model, including:

acquiring first color coordinates of a sample pixel in a first color space;

converting the first color coordinates of the sample pixel to second color coordinates of the sample pixel in a second color space;

inputting the second color coordinates of the sample pixel into an initial color correction model to generate sample output data; and training the initial color correction model according to the sample output data and theoretical output data corresponding to the first color coordinates, to obtain a trained color correction model, wherein the trained color correction model is configured to perform color correction on a target pixel in each of a plurality of video standards.

In some embodiments, the initial color correction model includes:

a first color mapping table configured to record sampling coordinates and color data of each of a plurality of first sampling points in a first sampling point space;

a reference point determination module configured to determine sampling coordinates of a plurality of first reference sampling points corresponding to the sample pixel in the first sampling point space, according to the second color coordinates of the sample pixel;

a query module configured to determine color data of each of the plurality of first reference sampling points, according to the sampling coordinates of the first reference sampling point and the first color mapping table; and an interpolation module configured to acquire the sample output data through an interpolation algorithm, according to the color data of the plurality of first reference sampling points, wherein the training the initial color correction model includes: updating the color data in the initial color mapping table.

In some embodiments, the first sampling point space includes a plurality of first sampling cubes, each of the plurality of first sampling cubes is defined by eight first sampling points as vertices of the first sampling cube, and the first sampling cube is divided into a plurality of tetrahedrons; and the reference point determination module is configured to map the second color coordinates of the sample pixel into the first sampling point space, to obtain a first mapping point of the second color coordinates of the sample pixel in the first sampling point space; and taking each vertex of the tetrahedron where the first mapping point is located as the first reference sampling point, and determining sampling coordinates of the first reference sampling point.

In some embodiments, the interpolation module is configured to acquire the sample output data according to the following formula:

$$\hat{f}(p) = [f(p_0)f(p_1)f(p_2)f(p_3)]\begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1}\begin{bmatrix} x \\ y \\ z \\ 1 \end{bmatrix},$$

wherein p represents the first mapping point, and $p_0$, $p_1$, $p_2$ and $p_3$ represent the vertices of the tetrahedron where the first mapping point is located; $\hat{f}(p)$ is the sample output data; $f(p_0)$, $f(p_1)$, $f(p_2)$, and $f(p_3)$ are the color data of the four vertices of the tetrahedron, respectively; $(x_0, y_0, z_0)$ are coordinates of the vertex $p_0$ with respect to a first datum point; $(x_1, y_1, z_1)$ are coordinates of the vertex $p_1$ with respect to the first datum point, $(x_2, y_2, z_2)$ are coordinates of the vertex $p_2$ with respect to the first datum point, $(x_3, y_3, z_3)$ are coordinates of the vertex $p_3$ with respect to the first datum point; and $(x, y, z)$ are coordinates of the the first mapping point with respect to the first datum point, wherein the first datum point is one of the vertices of the first sampling cube where the first mapping point is located.

In some embodiments, the first color space is a RGB space, and the second color space is an XYZ space.

In some embodiments, the sample pixel is a pixel in a sample image conforming to a preset video standard; and the converting the first color coordinates of the sample pixel to second color coordinates of the sample pixel in a second color space, includes:

converting the first color coordinates of the sample pixel to linear coordinates, according to a rule of non-linear conversion corresponding to the preset video standard; and converting the linear coordinates of the sample pixel to corresponding second color coordinates, according to a rule of conversion between the linear coordinates and the second color coordinates.

In some embodiments, an image including the sample pixel conforms to a preset video standard; and prior to the training the initial color correction model according to the sample output data and theoretical output data corresponding to the first color coordinates, the method further includes:

acquiring a second color mapping table corresponding to the preset video standard, wherein the second color mapping table records sampling coordinates and corresponding color data of each of a plurality of second sampling points in a second sampling point space;

determining sampling coordinates of a plurality of second reference sampling points corresponding to the second color coordinates of the sample pixel in the second sampling point space, according to the first color coordinates of the sample pixel;

determining color data of each of the plurality of second reference sampling points, according to the sampling coordinates of the second reference sampling point and the second color mapping table; and acquiring theoretical output data of the sample pixel through an interpolation algorithm, according to the color data of the plurality of second reference sampling points.

In some embodiments, the second sampling point space includes a plurality of second sampling cubes, each of the plurality of second sampling cubes is defined by eight second sampling points as vertices of the second sampling cube, and the second sampling cube is divided into a plurality of tetrahedrons; and the determining sampling coordinates of a plurality of second reference sampling points corresponding to the second color coordinates of the sample pixel in the second sampling point space, according to the first color coordinates of the sample pixel, includes:

mapping the first color coordinates of the sample pixel into the second sampling point space, to obtain a second mapping point of the first color coordinates of the sample pixel in the second sampling point space; and taking each vertex of the tetrahedron where the second mapping point is located as the second reference sampling point, and determining sampling coordinates of the second reference sampling point.

In some embodiments, the acquiring theoretical output data of the sample pixel through an interpolation algorithm, according to the color data of the plurality of second reference sampling points, includes:

acquiring theoretical output data of the sample pixel according to the following formula:

$$\hat{f}(p') = [f(p_0')f(p_1')f(p_2')f(p_3')]\begin{bmatrix} x_0' & x_1' & x_2' & x_3' \\ y_0' & y_1' & y_2' & y_3' \\ z_0' & z_1' & z_2' & z_3' \\ 1 & 1 & 1 & 1 \end{bmatrix}^{-1}\begin{bmatrix} x' \\ y' \\ z' \\ 1 \end{bmatrix},$$

wherein p' represents the second mapping point, and $p_0'$, $p_1'$, $p_2'$ and $p_3'$ represent the vertices of the tetrahedron where the second mapping point is located; $\hat{f}(p')$ is the theoretical output data; $f(p_0')$, $f(p_1')$, $f(p_2')$, and $f(p_3')$ are the color data of the four vertices of the tetrahedron; $(x_0', y_0', z_0')$ are coordinates of the vertex $p_0'$ with respect to a second datum point; $(x_1', y_1', z_1')$ are coordinates of the vertex $p_1'$ with respect to the second datum point, $(x_2', y_2', z_2')$ are coordinates of the vertex $p_2'$ with respect to the second datum point, $(x_3', y_3', z_3')$ are coordinates of the vertex $p_3'$ with respect to the second datum point; and $(x', y', z')$ are coordinates of the the second mapping point with respect to the second datum point, wherein the second datum point is one of the vertices of the second sampling cube where the second mapping point is located.

In a second aspect, the present disclosure provides a method of correcting color, including:

acquiring first color coordinates of a target pixel in a first color space;

converting the first color coordinates of the target pixel to second color coordinates of the target pixel in a second color space; and inputting the second color coordinates of the target pixel into a trained color correction model, to obtain target output data, wherein the trained color correction model is obtained according to the above method of generating a color correction model.

In some embodiments, the trained color correction model includes:

a first color mapping table configured to record sampling coordinates and color coordinates of each of a plurality of first sampling points in a first sampling point space;

a reference point determination module configured to determine sampling coordinates of a plurality of first reference sampling points corresponding to the target pixel in a first sampling point space, according to the second color coordinates of the target pixel;

a query module configured to determine color data of each of the plurality of first reference sampling points, according to the sampling coordinates of the first reference sampling point and the first color mapping table; and an interpolation module configured to acquire the target output data through an interpolation algorithm, according to color data of the plurality of first reference sampling points.

In some embodiments, the first sampling point space includes a plurality of first sample cubes, each of the plurality of first sampling cubes is defined by eight first sampling points as vertices of the first sampling cube, and the first sample cube is divided into a plurality of tetrahedrons; and the reference point determination module is configured to map the second color coordinates of the target pixel into the first sampling point space, to obtain a first mapping point of the second color coordinates of the target pixel in the first sampling point space; and taking each vertex of the tetrahedron where the first mapping point is located as the first reference sampling point, and determining sampling coordinates of the first reference sampling point.

In some embodiments, the converting the first color coordinates of the target pixel to second color coordinates of the target pixel in a second color space, includes:

converting the first color coordinates of the target pixel to linear coordinates according to a rule of non-linear conversion corresponding to a target video standard, wherein the target video standard is a video standard which is met by a target image including the target pixel; and converting the linear coordinates of the target pixel to corresponding second color coordinates, according to a rule of conversion between the linear coordinates and the second color coordinates.

In a third aspect, the present disclosure provides an apparatus for generating a color correction model, including:

a first acquisition module configured to acquire first color coordinates of a sample pixel in a first color space;

a first conversion module configured to convert the first color coordinates of the sample pixel to second color coordinates of the sample pixel in a second color space; and a training module configured to input the second color coordinates of the sample pixel into an initial color correction model, to generate sample output data, and train the initial color correction model according to the sample output data and theoretical output data corresponding to the first color coordinates, to obtain a trained color correction model, wherein the trained color correction model is configured to perform color correction on the target pixel in each of a plurality of video standards.

In a fourth aspect, the present disclosure provides an apparatus for correcting color, including:

a second acquisition module configured to obtain first color coordinates of a target pixel in a first color space;

a second conversion module configured to convert the first color coordinates of the target pixel to second color coordinates of the target pixel in a second color space; and a correction module configured to input the second color coordinates of the target pixel into a trained color correction model, to obtain target output data, wherein the trained color correction model is generated by the above apparatus for generating a color correction model.

In a fifth aspect, the present disclosure provides a computer readable medium storing a computer program which, when being executed by a processor, cause the processor to perform any one method described above.

In a sixth aspect, the present disclosure provides a display device, including:

one or more processors; and a memory for storing one or more programs which, when being executed by the one or more processors, cause the one or more processors to perform any one method described above.

BRIEF DESCRIPTION OF DRAWINGS

The accompanying drawings, which are included to provide a further understanding of the present disclosure and constitute a part of this specification, serve to explain the present disclosure together with the following detailed description, but do not constitute a limitation of the present disclosure. In the drawings:

FIG. 2 is a schematic diagram illustrating three relationships between a device display color gamut and a standard defined color gamut.

FIG. 3 is a schematic diagram illustrating a method of generating a color correction model provided in some embodiments of the present disclosure.

FIG. 4 is a flowchart of an alternative implementation of step S20 provided in some embodiments of the present disclosure.

Figure 5:
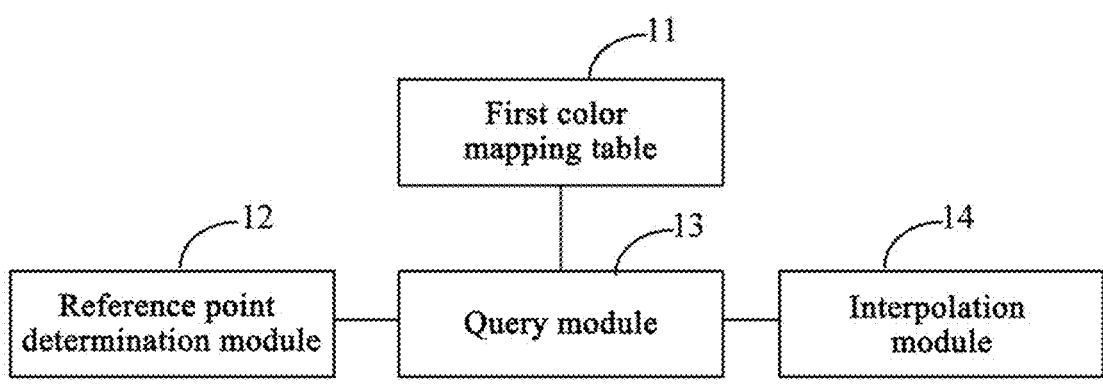

FIG. 5 is a schematic diagram illustrating an initial color correction model provided in some embodiments of the present disclosure.

Figure 6:
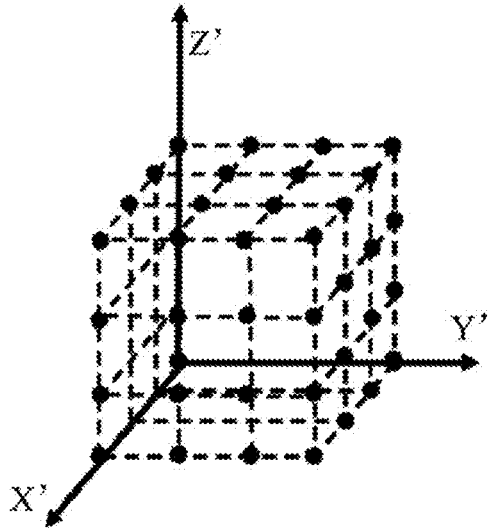

FIG. 6 is a schematic diagram illustrating a first sampling point space provided in some embodiments of the present disclosure.

Figure 7:
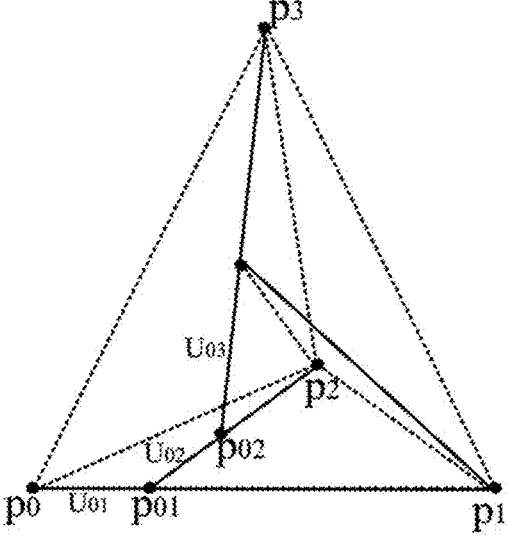

FIG. 7 is a schematic diagram illustrating a first mapping point p in a tetrahedron.

FIG. 8 is a flowchart illustrating a method of generating a color correction model provided in some embodiments of the present disclosure.

FIG. 9 is a schematic diagram illustrating a method of generating a second color mapping table provided in some embodiments of the present disclosure.

FIG. 10 is a flow chart illustrating steps of a preset processing provided in some embodiments of the present disclosure.

FIG. 11 is a schematic diagram illustrating a method of correcting color provided in some embodiments of the present disclosure.

Figure 12:
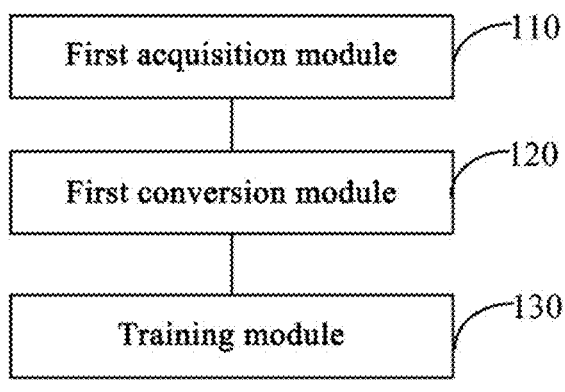

FIG. 12 is a schematic diagram illustrating an apparatus for generating a color correction model provided in some embodiments of the present disclosure.

Figure 13:
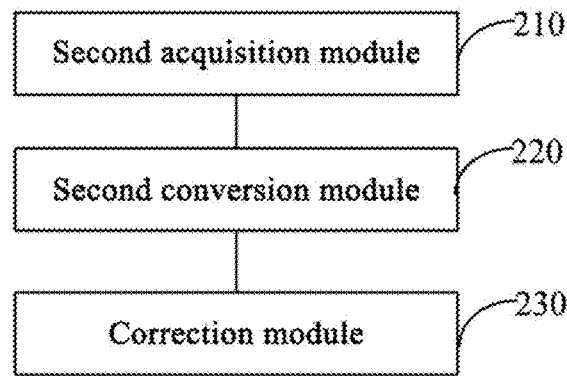

FIG. 13 is a schematic diagram illustrating an apparatus for correcting color provided in some embodiments of the present disclosure.

Figure 14:
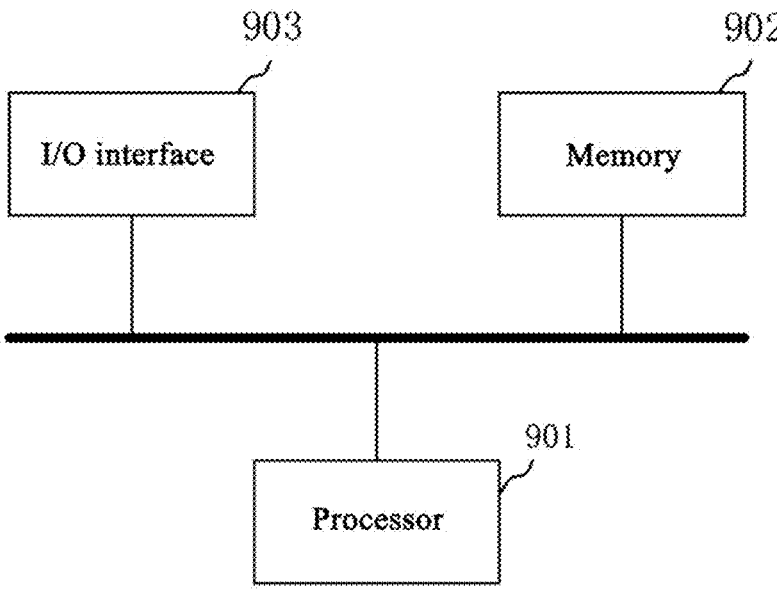

FIG. 14 is a schematic diagram illustrating a display device provided in some embodiments of the present disclosure.

DETAIL DESCRIPTION OF EMBODIMENTS

In order to make one of ordinary skill in the art better understand the technical solution of the present disclosure, a method and an apparatus for generating a color mapping table, a method and an apparatus for correcting color, a display device, and a computer readable medium provided in the present disclosure are described in detail below with reference to the accompanying drawings.

Example embodiments will be described more fully hereinafter with reference to the accompanying drawings, and may be embodied in different forms and should not be construed as limited to the embodiments set forth herein. Rather, these embodiments are provided so that this disclosure will be thorough and complete, and will fully convey the scope of the present disclosure to one of ordinary skill in the art.

The term used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the term "comprises" or "comprising", when used in this specification, may specify the presence of stated features, integers, steps, operations, elements, and/or components, but do not preclude the presence or addition of one or more other features, integers, steps, operations, elements, components, and/or groups thereof.

It will be understood that, although the terms "first", "second", etc. may be used herein to describe various elements, these elements should not be limited by these terms. These terms are only used to distinguish one element from another element. Therefore, a first element, a first component, or a first module discussed below could be termed a second element, a second component, or a second module without departing from the teachings of the present disclosure.

Unless otherwise defined, all terms (including technical and scientific terms) used herein have the same meaning as commonly understood by one of ordinary skill in the art.

It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Before describing the embodiments of the present disclosure, a color space and related concepts thereof involved in the present disclosure will be described first.

CIE-1931 XYZ color space: the international commission on illumination (CIE) defined a color space model, i.e., CIE 1931 XYZ color space, in 1931 for the first time in a purely mathematical manner. The CIE 1931 XYZ color space covers all colors that the human eye can perceive, not depending on any particular physical implementation. When a color is represented in XYZ form, a consistent color is rendered on any display that supports the XYZ standard, regardless of the specific physical characteristics of the display. The XYZ coordinates contain energy information of a light source, so the value has no upper limit.

CIE-1931 xyY color space: three orthogonal quantities x, y, z may be derived from the CIE tristimulus values, that is, $$x = X/(X + Y + Z), \ y = Y/(X + Y + Z), \ z = Z/(X + Y + Z).$$

The x, y components are used to measure chromaticity of a color, and a brightness (luminance) of the color is designed to be represented by the Y component of the tristimulus values. This is the CIE xyY space.

The basis for defining the CIE-1931 xyY color space is the fact that for a given color, if its brightness is increased, a luminous flux of each primary color is also increased proportionally, and a ratio of X:Y:Z remains the same, so that this color can be matched. Since the chromaticity values are only dependent on the wavelength (hue) and purity, but not on the total radiant energy, X, Y and Z may be normalized by the total radiant energy (X+Y+Z) when calculating the chromaticity of the color. Alternatively, considering only a case of a cross section of X+Y+Z=1, the color equation is simplified to x+y+z=1. Since z may be derived from x+y+z=1, the color may be represented by only x and y.

Figure 1A:
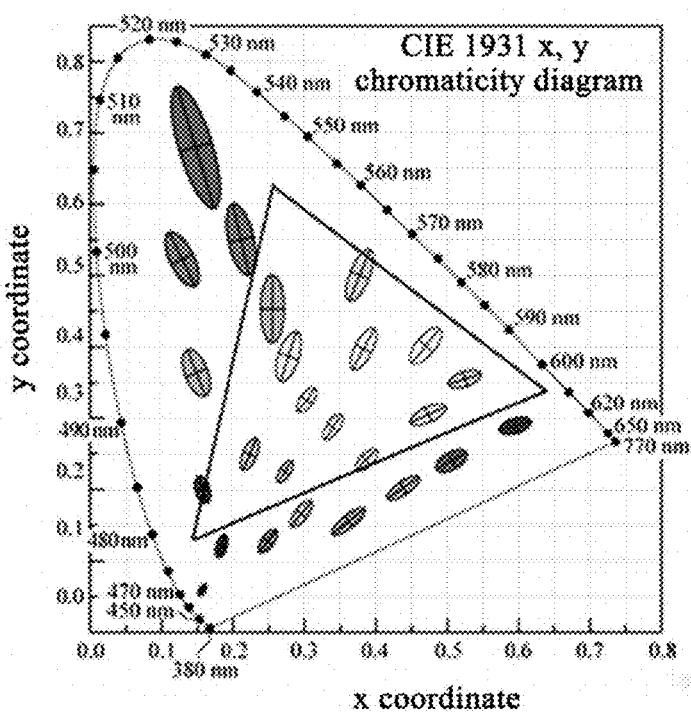
FIG. 1A is a schematic diagram illustrating a distribution rule of color tolerances at different positions in a chromaticity diagram.

Color tolerance: color tolerances at different positions in the chromaticity diagram are different from each other. FIG. 1A is a schematic diagram illustrating a distribution rule of color tolerances at different positions in a chromaticity diagram. In FIG. 1A, a size of the ellipse is enlarged to be approximately 10 times of the actual value, for a highlighting effect. In FIG. 1A, the color coordinates within the same ellipse are different from each other, but the human eye cannot distinguish the difference. The parts whose colors are close to each other may find close target values.

Figure 1B:
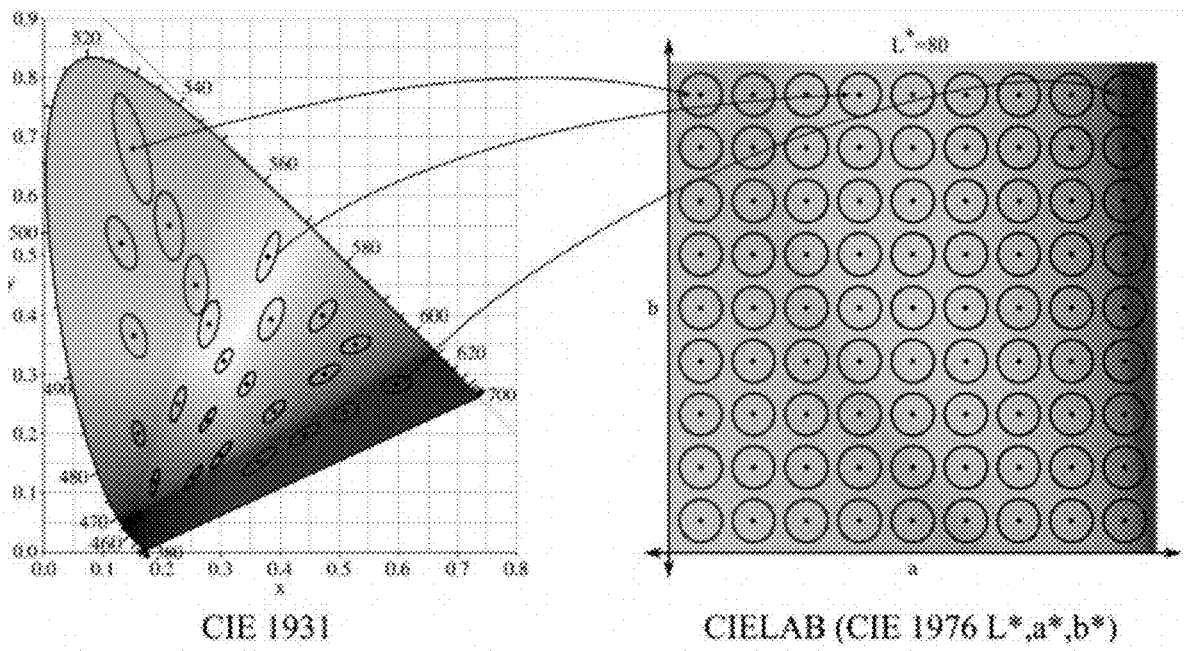
FIG. 1B is a diagram illustrating a comparison between a distribution of color tolerances in a chromaticity diagram and a distribution of color tolerances in a CIELAB color space.

Perceptually uniform color space: a color space is said to be perceptually uniform if it satisfies that a unit amount of change of a color value at an arbitrary position always corresponds to a same amount of perceptual change. A perceptually uniform space is characterized by equal color tolerance everywhere, regardless of the specific color values. The CIE-1931 xyY space is perceptually non-uniform in terms of this definition. In order to unify the calculation and comparison of colors, CIE again introduced a uniform color space. The CIE L*a*b* color space, also known as CIELAB, has a major advantage that a distance between colors better fits a linear relationship with human perception, especially an accuracy of describing darker colors is higher. A slight deficiency is that the linear relationship varies somewhat when describing the yellow region, i.e., the circle of color tolerance varies in diameter around yellow. FIG. 1B is a diagram illustrating a comparison between a distribution of color tolerances in a chromaticity diagram and a distribution of color tolerances in CIELAB color space. As can be seen in FIG. 1B, CIELAB color space is a perceptually uniform color space.

The mathematical definition of the CIELAB color model is:

$$\begin{cases} L^* = 116 f(Y/Y_n) - 16 \\ a^* = 500 [ f(X/X_n) - f(Y/Y_n) ], \\ b^* = 200 [ f(Y/Y_n) - f(Z/Z_n) ] \end{cases} \tag{0-1}$$

where $$f(X/X_n) = \begin{cases} (X/X_n)^{1/3} & X/X_n > 0.008856 \\ 7.787(X/X_n) + 16/116 & X/X_n \le 0.008856 \end{cases} \tag{0-2}$$

$$f(Y/Y_n) = \begin{cases} (Y/Y_n)^{1/3} & Y/Y_n > 0.008856 \\ 7.787(Y/Y_n) + 16/116 & Y/Y_n \le 0.008856 \end{cases}$$

$$f(Z/Z_n) = \begin{cases} (Z/Z_n)^{1/3} & Z/Z_n > 0.008856 \\ 7.787(Z/Z_n) + 16/116 & Z/Z_n \le 0.008856 \end{cases}$$

In the above formulas, L* represents the lightness of the color in a range of 0 to 100; a* and b* represent the chromaticity in a range of −128 to 128, where a* represents a red-green axis (red is positive, and green is negative), b* represents a yellow-blue axis (yellow is positive, and blue is negative), Xn, Yn, Zn represent X, Y, Z values of white light, respectively.

color gamut: a color gamut refers to a sum of colors that a color system is capable of producing. A color gamut in a narrow sense refers specifically to the technical capabilities of a color display system (such as a display and a printer). The CIE chromaticity diagram contains all colors visible to the human eye. This color gamut is somewhat too large for a color display system to support completely, and a practical system often supports only a sub-space within the chromaticity diagram, which is usually determined by the x and y values of the three primary colors. The three primary colors enclose a triangle, which determines the maximum range of colors that a color system can produce.

Mathematically, the color gamut triangle contains an infinite number of color points, while the actual display system is digitized, so that a series of discrete points need to be selected from a continuous color gamut according to a certain rule, to form a color gamut actually supported by the system. If the system represents colors with 8 bits, 256× 256×256=16,777,216 colors are included in the color gamut. To accurately define these 1600 million discrete points, a standard method is as follows: a white point is defined first, and after a position of the white point is determined, the values of the other colors are determined one by one using the dichotomy. If the position of the selected white point is different, a color set of the color gamut is also different.

The color gamut is equivalent to a measuring scale, the same value can be obtained only when the same scale is used for measuring color during shooting and displaying. For a same color, the values obtained by measuring the color with different scales are different.

Table 1 shows the definition values of several commonly used color gamuts. The BT.709 color gamut corresponds to a sRGB color space commonly used in the field of computers, BT.2020 is a standard color gamut for producing an ultra-high definition video, and DCI-P3 is a color gamut commonly used in movies.

TABLE 1

| | BT.709 | | DCI-P3 | | NTSC | | BT.2020 | | ACES | | XYZ | |
|---|---|---|---|---|---|---|---|---|---|---|---|---|
| | x | y | x | y | x | y | x | y | x | y | x | y |
| R | 0.640 | 0.330 | 0.680 | 0.320 | 0.670 | 0.330 | 0.708 | 0.292 | 0.7347 | 0.2653 | 1 | 0 |
| G | 0.300 | 0.600 | 0.265 | 0.690 | 0.210 | 0.710 | 0.170 | 0.797 | 0.0000 | 1.0000 | 0 | 1 |
| B | 0.150 | 0.060 | 0.150 | 0.060 | 0.140 | 0.080 | 0.131 | 0.046 | 0.0001 | −0.0770 | 0 | 0 |
| W | 0.3127 | 0.3290 | 0.314 | 0.351 | 0.310 | 0.316 | 0.3127 | 0.329 | 0.32168 | 0.33767 | | |

Monitors and commercial displays have a unique display color gamut after manufacturing the monitors and commercial displays. Generally, there are three relationships between a device display color gamut and a standard defined color gamut. FIG. 2 is a schematic diagram illustrating the three relationships between a device display color gamut and a standard defined color gamut. As shown in a case (a) in FIG. 2, the device display color gamut is smaller than the standard defined color gamut, in this case, the larger color gamut will be accurately reproduced only within the smaller color gamut, and a part of the standard defined color gamut, which exceeds the device display color gamut, cannot be accurately reproduced; as shown in a case (b) in FIG. 2, the device display color gamut is larger than the standard defined color gamut, and the smaller color gamut can be accurately simulated with the large color gamut; as shown in a case (c) in FIG. 2, where the device display color gamut and the standard defined color gamut partially overlap each other, colors of the overlapped part can be accurately restored, a color beyond the overlapped part cannot be accurately restored, and can only be approximated.

A goal of color correction is to present a true color of an input signal with a display having a unique color gamut. That is, color coordinates x, y values of the input signal are equal to the actually measured x, y values after outputting. For the same input signal, theoretical X, Y, Z values are obtained from R, G, B values of the input signal after standard conversion steps, then the theoretical x and y values are obtained according to the theoretical X, Y, Z values. On the other hand, corrected R, G, B values are obtained from R, G, B values of the input signal through a color mapping table, then displayed X, Y, Z values are obtained according to the corrected R, G, B values, then displayed x, y values are obtained according to the displayed X, Y, Z values. If the displayed x, y values are consistent with the theoretical x, y values, then the color correction is finished. In the process of converting the R, G, B values of the input signals to the theoretical X, Y, Z values, the used standard conversion steps include two parts: the first part is to perform a non-linear conversion (EOTF) to convert the R, G, B values (non-linear signals) of the input signal to linear signals, where the rule of the non-linear conversion are related to the video display standard. The second part is to convert the linear R, G, B values to values in the XYZ space.

In the process of color correction, a three-dimensional look up table (3D Look Up Table, 3 DLUT) is usually used, where the look up table describes the mapping relationship between input signals and output signals. The look up table has the advantage of fast operation speed, but the look up table occupies a lot of resources. The 3DLUT of 17×17×17 sampling points needs to occupy as many bytes as 17×3=14.4 KB. In addition, there are many video standards each having different gamma and color gamut, and each configuration needs to establish a look up table for correspondence, which occupies huge resources.

An embodiment of the present disclosure provides a method of generating a color correction model, where the color correction model is used for performing color correction on a display panel. FIG. 3 is a schematic diagram illustrating a method of generating a color correction model provided in some embodiments of the present disclosure. As shown in FIG. 3, the method of generating a color correction model includes steps S10 to S40.

Step S10, acquiring first color coordinates of a sample pixel in a first color space.

In some embodiments, the first color space may be any one of HSV (hue, saturation, Value) color space, YUV (brightness, chromaticity) color space, CMYK (cyan, magenta, yellow, black) color space, RGB (red, green, blue) color space.

In some embodiments, the sample pixel belongs to a sample image, or to a frame image in a sample video.

Step S20, converting the first color coordinates of the sample pixel to second color coordinates of the sample pixel in a second color space.

Step S30, inputting the second color coordinates of the sample pixel to an initial color correction model, to generate sample output data.

The color correction module may be used to correct a color, and parameters in the initial color correction model may be set as initial values, which may be randomly set or set according to a certain rule. It is understood that the data obtained using the initial color correction model is not optimal.

Step S40, training the initial color correction model according to the sample output data and theoretical output data corresponding to the first color coordinates, to obtain a trained color correction model, where the trained color correction model is used to perform color correction on target pixels in a plurality of video standards.

There are a plurality of the sample pixels, steps S10 to S30 may be performed for each of the plurality of sample pixels, and in step S40, a plurality of training processes may be performed, and parameters of the color correction model are adjusted according to the sample output data and theoretical output data of the sample pixels in each training process. In addition, in each training process, a value of a loss function may be determined according to the sample output data and the theoretical output data, and the parameters of the initial color correction model may be adjusted according to the value of the loss function. The loss function may be a function such as MSE, L1, or the like. When the number of times of training training times reach a target number or the value of the loss function is less than a preset threshold value, the training may be stopped, and a trained color correction model is obtained.

The theoretical output data refers to corrected data obtained in theory after standard color correction is performed on the sample pixel. In a case where the sample image or the sample video including the sample pixel conforms to a specific video standard, when performing standard color correction on the sample pixel, color correction may be performed using a look up table corresponding to the specific video standard.

In the embodiment of the present disclosure, the initial color correction model may generate sample output data according to the second color coordinates of the sample pixel, and the initial color correction model is trained according to the sample output data and the theoretical output data until a preset training condition is reached, so as to obtain the trained color correction model. When the trained color correction model is used for color correction, corrected data may be generated according to the second color coordinates (XYZ coordinates) of the pixel to be corrected. In the training process, the sample pixels may be selected from videos conforming to a video standard with a wide color gamut, so that the trained color correction model can be used as a universal color correction model to perform color correction on pixels in videos of different standards, and therefore resource occupation is reduced.

In some embodiments, the sample pixel is a pixel in a sample image, and the sample image is from a video conforming to a preset video standard. The preset video standard is BT.2020, and a color gamut of the BT.2020 video standard is a maximum color gamut that can be obtained at present. Therefore, the initial color correction model is trained using the sample pixels in the BT.2020 video standard, and the trained color correction model can be applied to various video standards.

In some embodiments, the first color space is a RGB color space, and the second color space is an XYZ color space, so that the trained color correction model corrects a color based on XYZ coordinates not related to physical characteristics of the display, which is beneficial to improving the accuracy of color correction.

FIG. 4 is a flowchart of an alternative implementation of step S20 provided in some embodiments of the present disclosure. Step S20 includes the following steps S21 to S22.

Step S21, converting the first color coordinates of the sample pixel to linear coordinates, according to a rule of non-linear conversion corresponding to the preset video standard.

In some embodiments, for BT2020, the rule of non-linear conversion is as shown in formula (1-1) below:

$$
\begin{aligned}
E &= \frac{E'}{4.500} & 0 \le E' < 0.081 \\
E &= \left(\frac{E' + 0.099}{1.099}\right)^{\frac{1}{0.45}} & 0.081 \le E' \le 1
\end{aligned}
\tag{1-1}
$$

E' represents non-linear coordinates, i.e., the first color coordinates, and E represents linear coordinates.

Step S22, converting the linear coordinates of the sample pixel to corresponding second color coordinates according to a rule of conversion between the linear coordinates and the second color coordinates.

The rule of conversion between the linear coordinates and the second color coordinates is expressed by the following formula (2-1):

$$
\begin{pmatrix} X \\ Y \\ Z \end{pmatrix} = \begin{pmatrix} x_r & x_g & x_b \\ y_r & y_g & y_b \\ z_r & z_g & z_b \end{pmatrix} \begin{pmatrix} r \cdot (X+Y+Z)_r \\ g \cdot (X+Y+Z)_g \\ b \cdot (X+Y+Z)_b \end{pmatrix} =
\tag{2-1}
$$

$$
\begin{pmatrix} x_r & x_g & x_b \\ y_r & y_g & y_b \\ z_r & z_g & z_b \end{pmatrix} \begin{pmatrix} (X+Y+Z)_r & 0 & 0 \\ 0 & (X+Y+Z)_g & 0 \\ 0 & 0 & (X+Y+Z)_b \end{pmatrix} \begin{pmatrix} r \\ g \\ b \end{pmatrix}
$$

The linear coordinates of the sample pixel are (r, g, b), and the values of r, g, b determine a proportional relationship among the three primary colors. The second color coordinate of the sample pixel in the second color space is (X, Y, Z). In formula (2-1), $$
\begin{pmatrix} x_r & x_g & x_b \\ y_r & y_g & y_b \\ z_r & z_g & z_b \end{pmatrix}
$$

represents the color coordinates of the three primary colors defined in the different video display standards, and values of the three primary colors are shown in table 2 below:

TABLE 2

| | BT.709 | | DCI-P3 | | BT.2020 | |
|---|---|---|---|---|---|---|
| | x | y | x | y | x | y |
| R | 0.640 | 0.330 | 0.680 | 0.320 | 0.708 | 0.292 |
| G | 0.300 | 0.600 | 0.265 | 0.690 | 0.170 | 0.797 |
| B | 0.150 | 0.060 | 0.150 | 0.060 | 0.131 | 0.046 |
| W | 0.3127 | 0.3290 | 0.314 | 0.351 | 0.3127 | 0.3290 |

In addition, in the formula (2-1), $$
\begin{pmatrix} (X+Y+Z)_r \\ (X+Y+Z)_g \\ (X+Y+Z)_b \end{pmatrix} = \begin{pmatrix} x_r & x_g & x_b \\ y_r & y_g & y_b \\ z_r & z_g & z_b \end{pmatrix}^{-1} \begin{pmatrix} X \\ Y \\ Z \end{pmatrix}_{D65},
$$

where $$
\begin{pmatrix} X \\ Y \\ Z \end{pmatrix}_{D65}
$$

represents the tristimulus values of the white point.

FIG. 5 is a schematic diagram illustrating an initial color correction model provided in some embodiments of the present disclosure. As shown in FIG. 5, the initial color correction model includes a first color mapping table 11, a reference point determination module 12, a query module 13 and an interpolation module 14. Each functional module in the embodiments of the present disclosure may be implemented as software, firmware, hardware, or a suitable combination thereof. For example, functional modules may be integrated into a same physical component (e.g., processor) that performs their functions. Alternatively, a plurality of functional modules may be integrated into a plurality of physical components, respectively, and the plurality of physical components cooperate to execute the functions of the modules or implement the steps of the method.

The first color mapping table 11 records sampling coordinates and color data of each of a plurality of first sampling points in a first sampling point space. The training the initial color correction model in step S40 specifically includes: updating the color data in the first color mapping table.

FIG. 6 is a schematic diagram illustrating a first sampling point space provided in some embodiments of the present disclosure. As shown in FIG. 6, each black dot represents one first sampling point. A plurality of first sampling points are uniformly distributed in the first sampling point space. It should be noted that, the number of the first sampling points in FIG. 6 is only an example, and the specific number may be set as required. For example, the first sampling point space is defined by three coordinate axes (marked as X' axis, Y' axis, and Z' axis, respectively), the second color coordinates of the first sampling point in the second color space are marked as (X, Y, Z), the X' axis is used to represent the X value of the first sampling point after data transformation, the Y' axis is used to represent the Y value of the first sampling point after data transformation, and the Z' axis is used to represent the Z value of the first sampling point after data transformation. For example, in the first sampling point space, eight points (0, 0, 0), (0, 255, 0), (255, 0, 0), (0, 0, 255), (0, 255, 255), (255, 0, 255) define a large cube, and the cube is equally divided into 16 parts in any one of the three directions, to obtain 16×16×16 first sampling cubes. The vertices of the first sampling cubes are first sampling points, and there are 17×17×17 first sampling points in total. Alternatively, the number of the first sampling cubes may be other numbers, for example 32×32×32.

The sampling coordinates of the first sampling point are coordinates of the first sampling point in the first sampling point space. That is, the sampling coordinates of the first sampling point are the results of data transformation performed on the second color coordinates of the first sampling point in the second color space. The second color coordinates of the first sampling point is marked as (X, Y, Z), and the data transformation may be performed by scaling down X, Y, Z to a value in a range of 0 to 1, and scaling up the scaled down values to obtain an integer between 0 and 255. It should be noted that the above-mentioned 255 is an example in which the number of bits of the display color of the display panel is 8 bits. Where the number of bits of the display color is other numbers of bits, for example, 10 bits, the maximum value of the X' axis, Y' axis, and Z' axis is 1023, and when performing the "data transformation", X, Y, Z are scaled down to a value in a range of 0 to 1, and the scaled down value is further scaled up to a value in a range of 0 to 1023.

The reference point determination module 12 is used to determine sampling coordinates of a plurality of first reference sampling points corresponding to the sample pixel in the first sampling point space, according to the second color coordinates of the sample pixel.

In some embodiments, the reference point determination module 12 is specifically used to map the second color coordinates of the sample pixel into the first sampling point space, to obtain a first mapping point of the second color coordinates of the sample pixel in the first sampling point space; each vertex of the tetrahedron where the first mapping point is located is taken as a first reference sampling point; the coordinates of the first reference sampling point in the first sampling point space are taken as the sampling coordinates of the first reference sampling point.

As described above, the sampling coordinates of the first sampling point are results of the data transformation performed on the second color coordinates of the first sampling point in the second color space. In this case, the same data transformation may be performed on the second color coordinates of the sample pixel, and the coordinates after the data transformation are the coordinates of the first mapping point.

The query module 13 is used to determine color data of each first reference sampling point, according to the sampling coordinates of each first reference sampling point and the first color mapping table.

It can be understood that each first reference sampling point is one of the first sampling points in the first sampling point space. Since the sampling coordinates and the color data of each first sampling point are recorded in the first color mapping table, after the sampling coordinates of the first reference sampling point are determined, the corresponding color data may be looked up in the first color mapping table.

The interpolation module 14 is used to acquire the sample output data through an interpolation algorithm, according to the color data of all the first reference sampling points.

In some embodiments, the interpolation module 14 is specifically used to acquire the sample output data according to the following formula:

$$\hat{f}(p) = [f(p_0)f(p_1)f(p_2)f(p_3)]\begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1}\begin{bmatrix} x \\ y \\ z \\ 1 \end{bmatrix}. \tag{3}$$

Where p represents the first mapping point, and $p_0$, $p_1$, $p_2$ and $p_3$ represent the vertices of the tetrahedron where the first mapping point is located; $\hat{f}(p)$ is the sample output data; $f(p_0)$, $f(p_1)$, $f(p_2)$, and $f(p_3)$ are the color data of the four vertices of the tetrahedron, respectively; $(x_0, y_0, z_0)$ are coordinates of the vertex $p_0$ with respect to a first datum point; $(x_1, y_1, z_1)$ are coordinates of the vertex $p_1$ with respect to the first datum point, $(x_2, y_2, z_2)$ are coordinates of the vertex $p_2$ with respect to the first datum point, $(x_3, y_3, z_3)$ are coordinates of the vertex $p_3$ with respect to the first datum point; and $(x, y, z)$ are coordinates of the the first mapping point with respect to the first datum point.

The first datum point is one of the vertices of the first sampling cube where the first mapping point is located. It can be understood that $x_0$ is a difference between the X value of the vertex $p_0$ after the data transformation and the X value of the first datum point after the data transformation; $y_0$ is a difference between the Y value of the vertex $p_0$ after the data transformation and the Y value of the first datum point after the data transformation, $z_0$ is a difference between the Z value of the vertex $p_0$ after the data transformation and the Z value of the first datum point after the data transformation. $x_1$ is a difference between the X value of the vertex $p_1$ after the data transformation and the X value of the first datum point after the data transformation; $y_1$ is a difference between the Y value of the vertex $p_1$ after the data transformation and the Y value of the first datum point after the data transformation, $z_1$ is a difference between the Z value of the vertex $p_1$ after the data transformation and the Z value of the first datum point after the data transformation. The relative coordinates of vertices $p_2$ and $p_3$ are the same, and will not be repeated herein.

The derivation process of formula (3) is as follows:

FIG. 7 is a schematic diagram illustrating a first mapping point p in a tetrahedron. As shown in FIG. 7, an extension line of a connection line between the first mapping point p and the vertex $p_3$ intersects a plane where $p_0$, $p_1$ and $p_2$ are located at a point $p_{02}$, an extension line of a connection line between the vertex $p_2$ and the intersection point $p_{02}$ intersects a connection line between $p_0$ and $p_1$ at a point poi, and a ratio of a length a connection line between the points $p_{01}$ and $p_{02}$ to a length of a connection line between $p_{01}$ and $p_2$ is $U_{02}$; a ratio of a length of a connection line between $p_0$ and $p_{01}$ to a length of a connection line between $p_0$ and $p_1$ is $U_{01}$; a ratio of a length of a connection line between the interpolation point p and the point $p_{02}$ to a length of a connection line between the points $p_{02}$ and $p_3$ is $U_{03}$.

$$\hat{f}(p) = f(p_0)(1-u_{03})(1-u_{02})(1-u_{01}) + \tag{3-1}$$
$$f(p_1)(1-u_{03})(1-u_{02})u_{01} + f(p_2)(1-u_{03})u_{02} + f(p_3)u_{03}$$

It can be obtained from formula (3-1) that:

$$\hat{f}(p) = \sum_{i=0}^{3} w_i f(p_i), \tag{3-2}$$

where $w_i$ represents a combination coefficient, $$\sum_{i=0}^{3} w_i = 1.$$

It can be further obtained that:

$$\hat{f}(p) = \sum_{i=0}^{3} \frac{V_i}{V} f(p_i), \tag{3-3}$$

where $$\sum_{i=0}^{3} \frac{V_i}{V} = 1,$$

V is a volume of a tetrahedron defined by $p_0$, $p_1$, $p_2$ and $p_3$, and $V_0$ is a volume of a tetrahedron defined by p, $p_1$, $p_2$ and $p_3$; $V_1$ is a volume of a tetrahedron defined by p, $p_0$, $p_2$ and $p_3$; $V_2$ is a volume of a tetrahedron defined by p, $p_0$, $p_1$ and $p_3$; and $V_3$ is a volume of a tetrahedron defined by p, $p_0$, $p_1$ and $p_2$.

According to the above formulas (3-1) to (3-3) and FIG. 7, the first mapping point is converted into a linear combination of endpoints, coefficients of the linear combination accord with a relationship between volume ratios, and the calculation process of the linear combination coefficient satisfies the following linear simultaneous equations:

$$\begin{bmatrix} x \\ y \\ z \\ 1 \end{bmatrix} = \begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix} \begin{bmatrix} w_0 \\ w_1 \\ w_2 \\ w_3 \end{bmatrix}$$

According to cramer rule, each combination coefficient $w_i$ can be found as follows:

$$w_0 = \frac{\begin{vmatrix} x & x_1 & x_2 & x_3 \\ y & y_1 & y_2 & y_3 \\ z & z_1 & z_2 & z_3 \\ 1 & 1 & 1 & 1 \end{vmatrix}}{\Delta} \quad w_1 = \frac{\begin{vmatrix} x_0 & x & x_2 & x_3 \\ y_0 & y & y_2 & y_3 \\ z_0 & z & z_2 & z_3 \\ 1 & 1 & 1 & 1 \end{vmatrix}}{\Delta}$$

$$w_2 = \frac{\begin{vmatrix} x_0 & x_1 & x & x_3 \\ y_0 & y_1 & y & y_3 \\ z_0 & z_1 & z & z_3 \\ 1 & 1 & 1 & 1 \end{vmatrix}}{\Delta} \quad w_3 = \frac{\begin{vmatrix} x_0 & x_1 & x_2 & x \\ y_0 & y_1 & y_2 & y \\ z_0 & z_1 & z_2 & z \\ 1 & 1 & 1 & 1 \end{vmatrix}}{\Delta}$$

$$\Delta = \begin{vmatrix} x_0 & x_1 & x_2 & x_3 \\ y_0 & y_1 & y_2 & y_3 \\ z_0 & z_1 & z_2 & z_3 \\ 1 & 1 & 1 & 1 \end{vmatrix}.$$

Hence, the above formula (3) can be derived.

It should be noted that the interpolation module 14 may alternatively employ other interpolation algorithms to acquire the sample output data of the sample pixel.

FIG. 8 is a flowchart illustrating a method of generating a color correction model provided in some embodiments of the present disclosure. As shown in FIG. 8, the method of generating a color correction model further includes the following steps S01 to S04 in addition to the above steps S10 to S40, and steps S01 to S04 are performed prior to step S40.

Step S01, acquiring a second color mapping table corresponding to the preset video standard, where the second color mapping table records sampling coordinates and corresponding color data of each second sampling point in a second sampling point space.

The sampling coordinates of the second sampling point refer to coordinates of the second sampling point in the second sampling point space.

In some embodiments, the second sampling point space includes a plurality of second sampling cubes. Each of the second sampling cubes is defined by eight second sampling points as vertices of the second sampling cube, and the second sampling cube may be divided into a plurality of tetrahedrons. In the second sampling point space, a plurality of second sampling points are uniformly distributed. In some embodiments, the second sampling point space is defined by three coordinate axes, and the three coordinate axes are used to represent the R value, the G value, and the B value of the second sampling point, respectively. That is, the coordinates of the second sampling point in the second sampling point space may coincide with the first color coordinates of the second sampling point in the first color space.

Step S02, determining sampling coordinates of a plurality of second reference sampling points in the second sampling point space corresponding to the second color coordinates of the sample pixel, according to the first color coordinates of the sample pixel.

In some embodiments, step S02 may specifically include the following steps S02a to S02b:

Step S02a, mapping the first color coordinates of the sample pixel into the second sampling point space, to obtain a second mapping point of the first color coordinates of the sample pixel in the second sampling point space.

As described above, the second sampling point space is defined by three coordinate axes, and the three coordinate axes are used to represent the R value, the G value, and the B value of the second sampling point, respectively. In this case, the second mapping point is a point in the second sampling point space, which have coordinates coinciding with the second color coordinates of the sample pixel.

Step S02b, taking each vertex of the tetrahedron where the second mapping point is located as a second reference sampling point, and determining the sampling coordinates of the second reference sampling point. The coordinates of the second reference sampling point in the second sampling point space are the sampling coordinates.

Step S03, determining the color data of each second reference sampling point, according to the sampling coordinates of the second reference sampling point and the second color mapping table.

Since the sampling coordinates and the color data of each second sampling point are recorded in the second color mapping table, the color data of the second reference sampling point can be inquired from the second color mapping table according to the sampling coordinates of the second reference sampling point.

Step S04, acquiring theoretical output data of the sample pixel through an interpolation algorithm, according to the color data of each second reference sampling point.

In some embodiments, the interpolation algorithm employed in step S04 may be the same as the interpolation algorithm employed in calculating the sample output data described above. Specifically, the theoretical output data of the sample pixel may be acquired in step S04 using the following formula (5).

$$\hat{f}(p') = [f(p'_0)f(p'_1)f(p'_2)f(p_3)]\begin{bmatrix} x'_0 & x'_1 & x'_2 & x'_3 \\ y'_0 & y'_1 & y'_2 & y'_3 \\ z'_0 & z'_1 & z'_2 & z'_3 \\ 1 & 1 & 1 & 1 \end{bmatrix}^{-1}\begin{bmatrix} x' \\ y' \\ z' \\ 1 \end{bmatrix}. \tag{5}$$

Where p' represents the second mapping point, and $p'_0$, $p'_1$, $p'_2$ and $p_3$ represent the vertices of the tetrahedron where the second mapping point is located; $\hat{f}(p')$ is the theoretical output data; $f(p'_0)$, $f(p'_1)$, $f(p'_2)$, and $f(p'_3)$ are the color data of the four vertices of the tetrahedron; $(x'_0, y'_0, z'_0)$ are coordinates of the vertex $p'_0$ with respect to the second datum point; $(x'_1, y'_1, z'_1)$ are coordinates of the vertex $p'_1$ with respect to the second datum point, $(x'_2, y'2, z'_2)$ are coordinates of the vertex $p_2$ with respect to the second datum point, $(x'_3, y'_3, z'_3)$ are coordinates of the vertex $p'_3$ with respect to the second datum point; and $(x', y', z')$ are coordinates of the the second mapping point with respect to the second datum point. The second datum point is one of the vertices of the second sampling cube where the second mapping point is located.

Compared with a cubic linear interpolation algorithm, the above interpolation method in the present disclosure is simple in operation and can obtain the theoretical output data more accurately and rapidly.

FIG. 9 is a schematic diagram illustrating a manner of generating a second color mapping table provided in some embodiments of the present disclosure. As shown in FIG. 9, the manner of generating the second color mapping table includes steps S001 to S003:

Step S001, acquiring display attribute information of a display panel. The display attribute information includes a mapping relationship between input color and output color of the display panel and a gamma curve of the display panel. The mapping relationship represents a relationship between the second color coordinates of an actually displayed color in the second color space and the linear coordinates of a test color data, when the display panel displays responding to the test color data. The linear coordinates of the test color data are obtained by performing non-linear conversion on the first color coordinates of the test color data in the first color space according to the gamma curve.

For example, the first color space is RGB color space, and the second color space is XYZ color space. The first color coordinates of the test color data in the first color space are marked as (Ri, Gi, Bi). Ri traverses 0 to 255, Gi traverses 0 to 255, and Bi traverses 0 to 255, resulting in 256×256×256 test color data. In step S01, each time the display panel displays the test color data, the color displayed by the display panel is captured, and the second color coordinates of the color displayed by the display panel in the second color space is acquired. In addition, the linear coordinates of the test color data are obtained according to the gamma curve of the display panel and the first color coordinates (Ri, Gi, Bi), so as to obtain a mapping relationship between the second color coordinates and the linear coordinates of the test color data, that is, a mapping relationship between the XYZ coordinates and the linear RGB coordinates.

The gamma curve of the display panel may be expressed as $$y_{output} = x^\gamma_{input},$$

where $y_{output}$ is a brightness displayed on the display panel, $$x^\gamma_{input}$$

is the input gray scale of the display panel. The input gray scale may be in a range of 0 to 255. If the input gray scale is 0, it means that the display panel displays a color of Ri=0, Gi=0, Bi=0; if the input gray scale is 1, it means that the display panel displays a colors of Ri=1, Gi=1, Bi=1; and so on. According to the input gray scale and the brightness displayed on the display panel, the gamma curve can be fitted. The linear coordinates of the test color data are marked as (Ri', Gi', Bi'), then Ri'=(Ri)$^{1/\gamma}$; Gi'=(Gi)$^{1/\gamma}$/Y; Bi'=(Bi)$^{1/\gamma}$.

It should be noted that, in the above example, the display color of the display panel is of 8 bits, and when the display color of the display panel is of other number of bits, the value ranges of Ri, Gi, and Bi are different.

Step S002, establishing a second sampling point space, according to the first color coordinates of a plurality of second sampling points in the first color space.

Optionally, step S002 may specifically include steps S002a to S002b.

Step S002a, establishing a three-dimensional coordinate system, where the three-dimensional coordinate system includes a first coordinate axis extending along a first direction, a second coordinate axis extending along a second direction, and a third coordinate axis extending along a third direction.

Step S002b, setting a plurality of second sampling points at equal intervals in a second sampling point space along a first direction, a second direction and a third direction, respectively, according to the number of preset sampling points. Every eight adjacent second sampling points form a second sampling cube with the eight adjacent second sampling points being vertices of the second sampling cube, and all the second sampling cubes form the second sampling point space. The coordinates of the second sampling point in the second sampling point space are consistent with the first color coordinates of the second sampling point. For example, the first color space is RGB space, and three coordinate axes of the three-dimensional coordinate system are used to represent the R value, the G value, and the B value of the second sampling point in the first color space, respectively.

For example, in the second sampling point space, eight points (0, 0, 0), (0, 255, 0), (255, 0, 0), (0, 0, 255), (0, 255, 255), (255, 0, 255) define a large cube, and the large cube is equally divided into 16 parts in any one of three directions, to obtain 16×16×16 second sampling cubes. The vertices of the second sampling cubes are the second sampling points, and there are 17×17×17 second sampling points in total.

Step S003, performing steps of a preset processing on each second sampling point to obtain color data of each second sampling point, and generating a second color mapping table according to the first color coordinates and the color data of each second sampling point.

FIG. 10 is a flow chart illustrating steps of a preset processing provided in some embodiments of the present disclosure. As shown in FIG. 10, the steps of the preset processing on each second sampling point includes the following steps S003a to S003d.

Step S003a, taking the second sampling point subjected to the steps of the preset processing as a source sampling point, and determining theoretical color coordinates of the source sampling point in a third color space according to a standard rule of conversion between the first color space and the third color space. The third color space is an LAB space.

In some embodiments, the determining the theoretical color coordinates of the source sampling point in the second color space according to a standard rule of conversion between the first color space and the second color space may specifically include steps S003a1 to S003a3.

Step S003a1, converting the first color coordinates of the source sampling point in the first color space to linear coordinates according to the preset video standard.

For example, if the preset video standard is BT2020, the first color coordinates of the source sampling point in the first color space are converted to linear coordinates according to the above formula (1-1).

Step S003a2, determining the second color coordinates of the source sampling point in the second color space according to the linear coordinates of the source sampling point and a rule of conversion between the linear coordinates and the second color coordinates.

The second color coordinates of the source sampling point in the second color space may be determined according to the above formula (2-1).

Step S003a3, determining theoretical color coordinates of the source sampling point in the third color space according to the second color coordinates of the source sampling point in the second color space and a rule of conversion between the second color space and the third color space.

The second color space is the XYZ space, the third color space is the LAB space, and the rule of conversion between the two spaces is referred to the above formula (0-1) and formula (0-2). According to the formula (0-1) and the formula (0-2), the color coordinates of the source sampling point in the second color space can be determined, and the color coordinates can be taken as the theoretical color coordinates.

Step S003b, determining a target sampling point corresponding to the source sampling point, according to the actual color coordinates, in the third color space, of at least a part of the second sampling points in the second sampling point space and the above-described theoretical color coordinates. The actual color coordinates of each second sampling point in the third color space are determined according to at least the display attribute information of the display panel and the first color coordinates of the second sampling points.

The non-linear first color coordinates of the second sampling point in the first color space can be converted to the linear coordinates according to the above formula (1-1); then the actual color coordinates of the second sampling point in the second color space are determined according to the mapping relationship between the input color and the output color of the display panel obtained in step S001; and then, the actual color coordinates of the second sampling point in the third color space are determined according to the rule of conversion between the second color space and the third color space.

In some embodiments, step S003b may include at least one target search process. Each target search process includes the following steps:

Step S003b1, determining a search area of a sphere by taking a first sampling point as the center of the sphere and a first preset value as the radius of the sphere.

For a color with same color coordinates, a difference between the RGB coordinate values in the color gamuts of different video standards is not too large, and the first preset value may be determined according to the difference between the RGB coordinate values of the color with the same color coordinates in different color gamuts. In some embodiments, the difference between RGB coordinates of the color with the same color coordinates in different color gamuts does not exceed a first preset value. In one example, the first preset value is less than or equal to 0.35×Max, where Max is a maximum value of the coordinate value of each dimension in the first color coordinates. For example, if the color displayed on the display panel is of 8 bits, the first preset value is less than or equal to 0.35×255.

Step S003b2, determining whether at least one second sampling point, which has a coordinate difference between the actual color coordinates and the theoretical color coordinates in the third color space less than a preset threshold value, exists in the search area of the sphere. If so, perform step S003b3. Otherwise, perform step S003b4.

If the actual color coordinates of a certain second sampling point in the third color space are marked as $(L_1, a_1, b_1)$ and the theoretical color coordinates are marked as $(L_2, a_2, b_2)$, then the coordinate difference between the two is calculated according to the following formula:

$$\Delta E_{ab}^{*} = \left[ (\Delta L^{*})^2 + (\Delta a^{*})^2 + (\Delta b^{*})^2 \right]^{1/2},$$

$$\begin{cases} \Delta L^{*} = L_2^{*} - L_1^{*} \\ \Delta a^{*} = a_2^{*} - a_1^{*} \\ \Delta b^{*} = b_2^{*} - b_1^{*} \end{cases}.$$

wherein $\Delta E^{*}_{ab}$ is also a quantitative index for evaluating a closeness between the colors represented by two coordinate points in the LAB space. When $\Delta E^{*}_{ab}$ is greater than 1.5, the two colors can be distinguished by naked eyes. Therefore, in some embodiments of the present disclosure, the preset threshold is set to a value less than or equal to 1.5, so that the finally generated color mapping table can reproduce more accurate colors when used in color correction. For example, the preset threshold is equal to 1.5.

Step S003$b$3, taking one of the second sampling points satisfying the condition in step S003$b$2 as a target sampling point.

In some embodiments, when it is determined in step S003$b$2 that one second sampling point in the search area of the sphere satisfies the condition (i.e., when the coordinate difference between the actual color coordinates of one second sampling point in the third color space and the theoretical color coordinates is less than the preset threshold), the second sampling point is taken as the target sampling point. When it is determined in step S003$b$2 that all of the plurality of (e.g., M number of) second sampling points satisfy the condition, a minimum coordinate difference is selected from the M number of coordinate differences corresponding to the M sampling points, and the second sampling point corresponding to the minimum coordinate difference is taken as the target sampling point.

Step S003$b$4, determining whether the current target search process is the Nth target search process. If so, taking the second sampling point corresponding to the minimum coordinate difference obtained in the N number of target search processes as a target sampling point; if not, get into the next target search process.

N is a preset integer greater than 1. An initial sampling point in the first target search process is the source sampling point. In each target search process subsequent to the first target search process, the initial sampling point is the second sampling point corresponding to the minimum coordinate difference obtained in the previous target search process.

With continued reference to FIG. 10, after the target sampling point is determined, continue the following steps S003$c$ and S003$d$.

Step S003$c$, converting the first color coordinates of the target sampling point to non-linear coordinates, according to a rule of non-linear conversion corresponding to the preset video standard.

Step S003$d$, converting the linear coordinates obtained in step S003$c$ to non-linear coordinates according to the gamma curve of the display panel, and taking the non-linear coordinates as the color data of the second sampling point.

Since the LAB color space is a perceptually uniform space, when the actual color coordinates of the target sampling point in the LAB space are close to the theoretical color coordinates of the source sampling points in the LAB space, the display panel displays according to the first color coordinates of the target sampling point, so that the color of the source sampling point can be better reproduced. Therefore, the pixels in the video according with the preset video standard can be better reproduced through the second color mapping table obtained through the above S001 to S003.

FIG. 11 is a schematic diagram illustrating a method of correcting color provided in some embodiments of the present disclosure. As shown in FIG. 11, the method of correcting color includes steps S100 to S300.

Step S100, acquiring first color coordinates of a target pixel in a first color space.

The target pixels are pixels to be subjected to color correction, the target pixels are from a target image, and the target image may be a target frame in a target video. The target image or target video conforms to any one of a plurality of video standards, for example, conforms to any one of BT.709, DCI-P3, and BT.2020.

In some embodiments, the first color space may be RGB space.

Step S200, converting the first color coordinates of the target pixel to second color coordinates of the target pixel in a second color space, where the second color space is XYZ space.

In some embodiments, step S200 may specifically include the following steps S201 and S202.

Step S201, converting the first color coordinates of the target pixel to linear coordinates according to a rule of non-linear conversion corresponding to the target video standard. The target video standard is a video standard which is actually met by a target image including the target pixel.

For example, for BT2020 and BT709, the rule of non-linear conversions for both are shown as the following formula (7-1):

$$E = \frac{E'}{4.500} \qquad 0 \le E' < 0.081 \qquad (7\text{-}1)$$
$$E = \left(\frac{E' + 0.099}{1.099}\right)^{\frac{1}{0.45}} \quad 0.081 \le E' \le 1$$

For DCI-P3, the rule of non-linear conversion is shown as the following formula (7-2):

$$E = E'^{2.6}. \qquad (7\text{-}2)$$

For BT2100-HLG, the rule of non-linear conversion is shown as the following formula (7-3):

$$E = \frac{E'^{2.6}}{3}, \quad 0 \le E' \le 1/2 \qquad (7\text{-}3)$$
$$E = \frac{E' + b}{12}, \quad 1/2 < E' \le 1$$
$$a = 0.17883277,$$
$$b = 1 - 4a,$$
$$c = 0.5 - a\ln(4a).$$

For BT2100-PQ, the rule of non-linear conversion is shown in the following formula (7-4):

$$Y = \left(\frac{\max\left[\left(E'^{\frac{1}{m2}} - c1\right), 0\right]}{c2 - c3E'^{\frac{1}{m2}}}\right)^{\frac{1}{m1}} \qquad (7\text{-}4)$$
$$m1 = 2610/16384$$
$$m2 = 2523/4096 \times 128$$
$$c1 = 3424/4096 = c3 - c2 + 1$$
$$c2 = 2413/4096 \times 32$$
$$c3 = 2392/4096 \times 32.$$

In the above formulas of the rule of non-linear conversions, E' represents non-linear coordinates, i.e., first color coordinates, and E represents linear coordinates.

Step S202, converting the linear coordinates of the target pixel to corresponding second color coordinates according to a rule of conversion between the linear coordinates and the second color coordinates. The rule of conversion between the linear coordinates and the second color coordinates is shown in the above formula (2-1), and is not repeated herein.

Step S300, inputting the second color coordinates of the target pixel into a trained color correction model to obtain target output data. The trained color correction model is obtained according to the generation method in the above embodiment.

It should be noted that the trained color correction model is structurally the same as the initial color correction model, except that the parameters of the model are different. The trained color correction model includes a first color mapping table, a reference point determination module, a query module and an interpolation module. The first color mapping table records sampling coordinates and corresponding color coordinates of each of a plurality of first sampling points in a first sampling point space.

As described above, in the training process of the color correction model, the reference point determination module determines the sampling coordinates of a plurality of first reference sampling points corresponding to the sample pixel in the first sampling point space, according to the second color coordinates of the sample pixel. In the color correction process, when the second color coordinates of the target pixel is input into the color correction model, the reference point determination module determines the sampling coordinates of a plurality of first reference sampling points corresponding to the target pixel in the first sampling point space, according to the second color coordinates of the target pixel.

The reference point determination module may map the second color coordinates of the target pixel into the first sampling point space, to obtain a first mapping point of the second color coordinates of the target pixel in the first sampling point space. Each vertex of the tetrahedron where the first mapping point is located is taken as the first reference sampling point, and the sampling coordinates of the first reference sampling point are determined. As described above, the sampling coordinates of each first sampling point are the coordinates of the first sampling point in the first sampling point space, that is, the result of data transformation performed on the second color coordinates of the first sampling point in the second color space.

In the training process of the color correction model, the query module determines the color data of each first reference sampling point corresponding to the sample pixel, according to the sampling coordinates of each first reference sampling point corresponding to the sample pixel and the first color mapping table. In the color correction process, when the reference point determination module determines the sampling coordinates of each first reference sampling point corresponding to the target pixel, the query module may query the color data of each first reference sampling point corresponding to the target pixel in the first color mapping table.

Similarly, in the color correction process, the interpolation module may acquire the target output data through an interpolation algorithm according to the color data of each first reference sampling point corresponding to the target pixel.

The interpolation module may specifically acquire theoretical output data of the sample pixel according to the following formula (6).

$$\hat{f}(p'') = [f(p_0'')f(p_1'')f(p_2'')f(p_3'')]\begin{bmatrix} x_0'' & x_1'' & x_2'' & x_3'' \\ y_0'' & y_1'' & y_2'' & y_3'' \\ z_0'' & z_1'' & z_2'' & z_3'' \\ 1 & 1 & 1 & 1 \end{bmatrix}^{-1}\begin{bmatrix} x'' \\ y'' \\ z'' \\ 1 \end{bmatrix}. \quad (6)$$

Where p'' represents the first mapping point, and $p''_0$, $p''_1$, $p''_2$ and $p''_3$ represent the vertices of the tetrahedron where p'' is located; $\hat{f}(p'')$ is the theoretical output data; $f(p''_0)$, $f(p''_1)$, $f(p''_2)$, and $f(p''_3)$ are the color data of the four vertices of the tetrahedron where p'' is located; $(x''_0, y''_0, z''_0)$ are coordinates of the vertex $p''_0$ with respect to the first datum point; $(x''_1, y''_1, z''_1)$ are coordinates of the vertex $p''_1$ with respect to the first datum point, $(x''_2, y''_2, z''_2)$ are coordinates of the vertex $p''_2$ with respect to the first datum point, $(x''_3, y''_3, z''_3)$ are coordinates of the vertex $p''_3$ with respect to the first datum point; and $(x'', y'', z'')$ are coordinates of the the first mapping point with respect to the first datum point. The first datum point is one of the vertices of the first sampling cube where the first mapping point p'' is located.

FIG. 12 is a schematic diagram illustrating an apparatus for generating a color correction model provided in some embodiments of the present disclosure. As shown in FIG. 12, the apparatus for generating a color correction model includes: a first acquisition module 110, a first conversion module 120, and a training module 130.

The first acquisition module 110 is used to acquire first color coordinates of a sample pixel in a first color space.

The first conversion module 120 is used to convert the first color coordinates of the sample pixel to second color coordinates of the sample pixel in a second color space.

The training module 130 is used to input the second color coordinates of the sample pixel into an initial color correction model, to generate sample output data, and train the initial color correction model according to the sample output data and theoretical output data corresponding to the first color coordinates, to obtain a trained color correction model.

FIG. 13 is a schematic diagram illustrating an apparatus for correcting color provided in some embodiments of the present disclosure. As shown in FIG. 13, the apparatus for correcting color includes a second acquisition module 210, a second conversion module 220, and a correction module 230.

The second acquisition module 210 is used to acquire first color coordinates of a target pixel in a first color space.

The second conversion module 220 is used to convert the first color coordinates of the target pixel to second color coordinates in a second color space, which is XYZ space.

The correction module 230 is used to input the second color coordinates of the target pixel into the trained color correction model, to obtain target output data. And the trained color correction model is obtained according to the above generation apparatus.

FIG. 14 is a schematic diagram illustrating a display device provided in some embodiments of the present disclosure. As shown in FIG. 14, the display device includes:

one or more processors 901;

a memory 902 storing one or more programs which, when executed by the one or more processor, cause the one or more processor to perform the method of generating a color mapping table or the method of correcting color in the above embodiment; and one or more I/O interfaces 903 coupled between the processor and the memory and configured to enable information interaction between the processor and the memory.

The processor 901 is a device with data processing capability, which includes but is not limited to a central processing unit (CPU), or the like. The memory 902 is a device having data storage capabilities including, but not limited to, random access memory (RAM, more specifically SDRAM, DDR, etc.), read only memory (ROM), electrically erasable programmable read only memory (EE-PROM), flash memory (FLASH). The I/O interface (read/write interface) 903 coupled between the processor 901 and the memory 902 may enable information interaction between the processor 901 and the memory 902, which may include, but is not limited to, a data bus (Bus), or the like.

In some embodiments, the display device further includes a display panel to which original color data corresponding to an image and a video is transmitted after being corrected. The display device may be a monitor, in which a conversion of an input original screen color gamut to a target color gamut may be achieved by color correction.

In some embodiments, the processor 901, the memory 902, and the I/O interface 903 are connected to each other through a bus, and in turn to other components of the computing device.

The present embodiment further provide a computer readable medium storing a computer program which, when executed by a processor, cause the processor to perform the method of generating a color mapping table or the method of correcting color in the above embodiment, and in order to avoid a repeated description, specific steps of the method are not described herein again.

It will be understood by one of ordinary skill in the art that all or some of the steps of the methods, function modules/units in the systems or apparatus disclosed above may be implemented as software, firmware, hardware, or suitable combinations thereof. In a hardware implementation, a division between the function modules/units mentioned in the above description does not necessarily correspond to a division of physical components. For example, one physical component may have a plurality of functions, or one function or step may be performed by several physical components in cooperation. Some or all of the physical components may be implemented as software executed by a processor, such as a central processing unit, digital signal processor, or microprocessor, or as hardware, or as an integrated circuit, such as an application specific integrated circuit. Such software may be distributed on a computer readable medium, which may include a computer storage medium (a non-transitory medium) and a communication medium (a transitory medium). As is well known to one of ordinary skill in the art, the term "computer storage medium" includes volatile and nonvolatile, removable and non-removable media implemented in any method or technology for storage of information (such as computer readable commands, data structures, program modules or other data). The computer storage medium includes, but is not limited to, RAM, ROM, EPROM, flash memory or other memory technologies, CD-ROM, digital versatile disc (DVD) or other optical disk storage, magnetic cassette, magnetic tape, magnetic disk storage or other magnetic storage apparatuses, or any other medium which can be used to store the desired information and can be accessed by a computer. In addition, as is well known to one of ordinary skill in the art, the communication medium typically contains computer readable commands, data structures, program modules or other data in a modulated data signal such as a carrier wave or other transport mechanism, and includes any information delivery medium.

It should be noted that, in the present disclosure, the terms "comprise", "include", or any other variation thereof, are intended to encompass a non-exclusive inclusion, such that a process, method, article, or apparatus that comprises a list of elements includes not only those elements but also other elements not expressly listed or inherent to such process, method, article, or apparatus. Without further limitation, an element defined by the phrase "comprising a/an . . . " does not exclude the presence of additional identical elements in the process, method, article, or apparatus that comprises the element.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. A method of generating a color correction model, comprising:
   acquiring first color coordinates of a sample pixel in a first color space;
   converting the first color coordinates of the sample pixel to second color coordinates of the sample pixel in a second color space;
   inputting the second color coordinates of the sample pixel into an initial color correction model to generate sample output data; and
   training the initial color correction model according to the sample output data and theoretical output data corresponding to the first color coordinates, to obtain a trained color correction model, wherein the trained color correction model is configured to perform color correction on a target pixel in each of a plurality of video standards,
   wherein the initial color correction model comprises:
   a first color mapping table configured to record sampling coordinates and color data of each of a plurality of first sampling points in a first sampling point space;
   a reference point determination module configured to determine sampling coordinates of a plurality of first reference sampling points corresponding to the sample pixel in the first sampling point space, according to the second color coordinates of the sample pixel;
   a query module configured to determine color data of each of the plurality of first reference sampling points, according to the sampling coordinates of the first reference sampling point and the first color mapping table; and
   an interpolation module configured to acquire the sample output data through an interpolation algorithm, according to the color data of the plurality of first reference sampling points,
   wherein the training the initial color correction model comprises: updating the color data in the initial color mapping table.

2. The method according to claim 1, wherein the first sampling point space comprises a plurality of first sampling cubes, each of the plurality of first sampling cubes is defined by eight first sampling points as vertices of the first sampling cube, and the first sampling cube is divided into a plurality of tetrahedrons; and
   the reference point determination module is configured to map the second color coordinates of the sample pixel into the first sampling point space, to obtain a first mapping point of the second color coordinates of the sample pixel in the first sampling point space; and taking each vertex of the tetrahedron where the first mapping point is located as the first reference sampling point, and determining sampling coordinates of the first reference sampling point.

3. The method according to claim 2, wherein the interpolation module is configured to acquire the sample output data according to the following formula:

$$\hat{f}(p) = [f(p_0)f(p_1)f(p_2)f(p_3)] \begin{bmatrix} x_0 & x_1 & x_2 & x_3 \\ y_0 & y_1 & y_2 & y_3 \\ z_0 & z_1 & z_2 & z_3 \\ 1 & 1 & 1 & 1 \end{bmatrix}^{-1} \begin{bmatrix} x \\ y \\ z \\ 1 \end{bmatrix},$$

wherein p represents the first mapping point, and $p_0$, $p_1$, $p_2$ and $p_3$ represent the vertices of the tetrahedron where the first mapping point is located; $\hat{f}(p)$ is the sample output data; $f(p_0)$, $f(p_1)$, $f(p_2)$, and $f(p_3)$ are the color data of the four vertices of the tetrahedron, respectively; $(x_0\ y_0,\ z_0)$ are coordinates of the vertex $p_0$ with respect to a first datum point; $(x_1,\ y_1,\ z_1)$ are coordinates of the vertex $p_1$ with respect to the first datum point, $(x_2,\ y_2,\ z_2)$ are coordinates of the vertex $p_2$ with respect to the first datum point, $(x_3,\ y_3,\ z_3)$ are coordinates of the vertex $p_3$ with respect to the first datum point; and $(x,\ y,\ z)$ are coordinates of the the the first mapping point with respect to the first datum point, wherein the first datum point is one of the vertices of the first sampling cube where the first mapping point is located.

4. The method according to claim 1, wherein the first color space is a RGB space, and the second color space is an XYZ space.

5. The method according to claim 1, wherein the sample pixel is a pixel in a sample image conforming to a preset video standard; and the converting the first color coordinates of the sample pixel to second color coordinates of the sample pixel in a second color space, comprises:

converting the first color coordinates of the sample pixel to linear coordinates, according to a rule of non-linear conversion corresponding to the preset video standard; and converting the linear coordinates of the sample pixel to corresponding second color coordinates, according to a rule of conversion between the linear coordinates and the second color coordinates.

6. The method according to claim 1, wherein an image comprising the sample pixel conforms to a preset video standard; and prior to the training the initial color correction model according to the sample output data and theoretical output data corresponding to the first color coordinates, the method further comprises:

acquiring a second color mapping table corresponding to the preset video standard, wherein the second color mapping table records sampling coordinates and corresponding color data of each of a plurality of second sampling points in a second sampling point space;

determining sampling coordinates of a plurality of second reference sampling points corresponding to the second color coordinates of the sample pixel in the second sampling point space, according to the first color coordinates of the sample pixel;

determining color data of each of the plurality of second reference sampling points, according to the sampling coordinates of the second reference sampling point and the second color mapping table; and acquiring theoretical output data of the sample pixel through an interpolation algorithm, according to the color data of the plurality of second reference sampling points.

7. The method according to claim 6, wherein the second sampling point space comprises a plurality of second sampling cubes, each of the plurality of second sampling cubes is defined by eight second sampling points as vertices of the second sampling cube, and the second sampling cube is divided into a plurality of tetrahedrons; and the determining sampling coordinates of a plurality of second reference sampling points corresponding to the second color coordinates of the sample pixel in the second sampling point space, according to the first color coordinates of the sample pixel, comprises:

mapping the first color coordinates of the sample pixel into the second sampling point space, to obtain a second mapping point of the first color coordinates of the sample pixel in the second sampling point space; and taking each vertex of the tetrahedron where the second mapping point is located as the second reference sampling point, and determining sampling coordinates of the second reference sampling point.

8. The method according to claim 7, wherein the acquiring theoretical output data of the sample pixel through an interpolation algorithm, according to the color data of the plurality of second reference sampling points, comprises:

acquiring theoretical output data of the sample pixel according to the following formula:

$$\hat{f}(p') = [f(p'_0)f(p'_1)f(p'_2)f(p'_3)] \begin{bmatrix} x'_0 & x'_1 & x'_2 & x'_3 \\ y'_0 & y'_1 & y'_2 & y'_3 \\ z'_0 & z'_1 & z'_2 & z'_3 \\ 1 & 1 & 1 & 1 \end{bmatrix}^{-1} \begin{bmatrix} x' \\ y' \\ z' \\ 1 \end{bmatrix},$$

wherein p' represents the second mapping point, and $p'_0$, $p'_1$, $p'_2$ and $p'_3$ represent the vertices of the tetrahedron where the second mapping point is located; $f(p')$ is the theoretical output data; $f(p'_0)$, $f(p'_1)$, $f(p'_2)$, and $f(p'_3)$ are the color data of the four vertices of the tetrahedron; $(x'_0,\ y'_0,\ z'_0)$ are coordinates of the vertex $p'_0$ with respect to a second datum point; $(x'_1,\ y'_1,\ z'_1)$ are coordinates of the vertex $p'_1$ with respect to the second datum point, $(x'_2,\ y'_2,\ z'_2)$ are coordinates of the vertex $p'_2$ with respect to the second datum point, $(x'_3,\ y'_3,\ z'_3)$ are coordinates of the vertex $p'_3$ with respect to the second datum point; and $(x',\ y',\ z')$ are coordinates of the the second mapping point with respect to the second datum point, wherein the second datum point is one of the vertices of the second sampling cube where the second mapping point is located.

9. A method of correcting color, comprising:

acquiring first color coordinates of a target pixel in a first color space;

converting the first color coordinates of the target pixel to second color coordinates of the target pixel in a second color space; and inputting the second color coordinates of the target pixel into a trained color correction model, to obtain target output data, wherein the trained color correction model is obtained according to the method according to claim 1, wherein the trained color correction model comprises:

a first color mapping table configured to record sampling coordinates and color coordinates of each of a plurality of first sampling points in a first sampling point space:

a reference point determination module configured to determine sampling coordinates of a plurality of first reference sampling points corresponding to the target pixel in a first sampling point space, according to the second color coordinates of the target pixel:

a query module configured to determine color data of each of the plurality of first reference sampling points, according to the sampling coordinates of the first reference sampling point and the first color mapping table; and an interpolation module configured to acquire the target output data through an interpolation algorithm, according to color data of the plurality of first reference sampling points.

10. The method of correcting color according to claim 9, wherein the first sampling point space comprises a plurality of first sample cubes, each of the plurality of first sampling cubes is defined by eight first sampling points as vertices of the first sampling cube, and the first sample cube is divided into a plurality of tetrahedrons; and the reference point determination module is configured to map the second color coordinates of the target pixel into the first sampling point space, to obtain a first mapping point of the second color coordinates of the target pixel in the first sampling point space; and taking each vertex of the tetrahedron where the first mapping point is located as the first reference sampling point, and determining sampling coordinates of the first reference sampling point.

11. The method of correcting color according to claim 9, wherein the converting the first color coordinates of the target pixel to second color coordinates of the target pixel in a second color space, comprises:

converting the first color coordinates of the target pixel to linear coordinates according to a rule of non-linear conversion corresponding to a target video standard, wherein the target video standard is a video standard which is met by a target image comprising the target pixel; and converting the linear coordinates of the target pixel to corresponding second color coordinates, according to a rule of conversion between the linear coordinates and the second color coordinates.

12. An apparatus for generating a color correction model, comprising:

a first acquisition module configured to acquire first color coordinates of a sample pixel in a first color space;

a first conversion module configured to convert the first color coordinates of the sample pixel to second color coordinates of the sample pixel in a second color space; and a training module configured to input the second color coordinates of the sample pixel into an initial color correction model, to generate sample output data, and train the initial color correction model according to the sample output data and theoretical output data corresponding to the first color coordinates, to obtain a trained color correction model, wherein the trained color correction model is configured to perform color correction on the target pixel in each of a plurality of video standards, wherein the initial color correction model comprises:

a first color mapping table configured to record sampling coordinates and color data of each of a plurality of first sampling points in a first sampling point space;

a reference point determination module configured to determine sampling coordinates of a plurality of first reference sampling points corresponding to the sample pixel in the first sampling point space, according to the second color coordinates of the sample pixel;

a query module configured to determine color data of each of the plurality of first reference sampling points, according to the sampling coordinates of the first reference sampling point and the first color mapping table; and an interpolation module configured to acquire the sample output data through an interpolation algorithm, according to the color data of the plurality of first reference sampling points, wherein the training module is configured to update the color data in the initial color mapping table.

13. An apparatus for correcting color, comprising:

a second acquisition module configured to obtain first color coordinates of a target pixel in a first color space;

a second conversion module configured to convert the first color coordinates of the target pixel to second color coordinates of the target pixel in a second color space; and a correction module configured to input the second color coordinates of the target pixel into a trained color correction model, to obtain target output data, wherein the trained color correction model is generated by the apparatus according to claim 12, wherein the trained color correction model comprises:

a first color mapping table configured to record sampling coordinates and color coordinates of each of a plurality of first sampling points in a first sampling point space;

a reference point determination module configured to determine sampling coordinates of a plurality of first reference sampling points corresponding to the target pixel in a first sampling point space, according to the second color coordinates of the target pixel;

a query module configured to determine color data of each of the plurality of first reference sampling points, according to the sampling coordinates of the first reference sampling point and the first color mapping table; and an interpolation module configured to acquire the target output data through an interpolation algorithm, according to color data of the plurality of first reference sampling points.

14. A non-transitory computer readable medium storing a computer program which, when being executed by a processor, cause the processor to perform the method according to claim 1.

15. A display device, comprising:

one or more processors; and a memory for storing one or more programs which, when being executed by the one or more processors, cause the one or more processors to perform the method according to claim 1.

16. A non-transitory computer readable medium storing a computer program which, when being executed by a processor, cause the processor to perform the method according to claim 9.

17. A display device, comprising:

one or more processors; and a memory for storing one or more programs which, when being executed by the one or more processors, cause the one or more processors to perform the method according to claim 9.

* * * * *